Nov. 2, 1971  D. D. GRONHOLZ ET AL  3,616,618
AIR FILTER GASKET ELEMENT
Filed Aug. 13, 1969  2 Sheets-Sheet 1

INVENTOR.
DONALD D. GRONHOLZ
DELMER L. RADEZTSKY
BY
Merchant & Gould
ATTORNEYS

Nov. 2, 1971　　　D. D. GRONHOLZ ET AL　　　3,616,618
AIR FILTER GASKET ELEMENT
Filed Aug. 13, 1969　　　　　　　　　　　　2 Sheets-Sheet 2
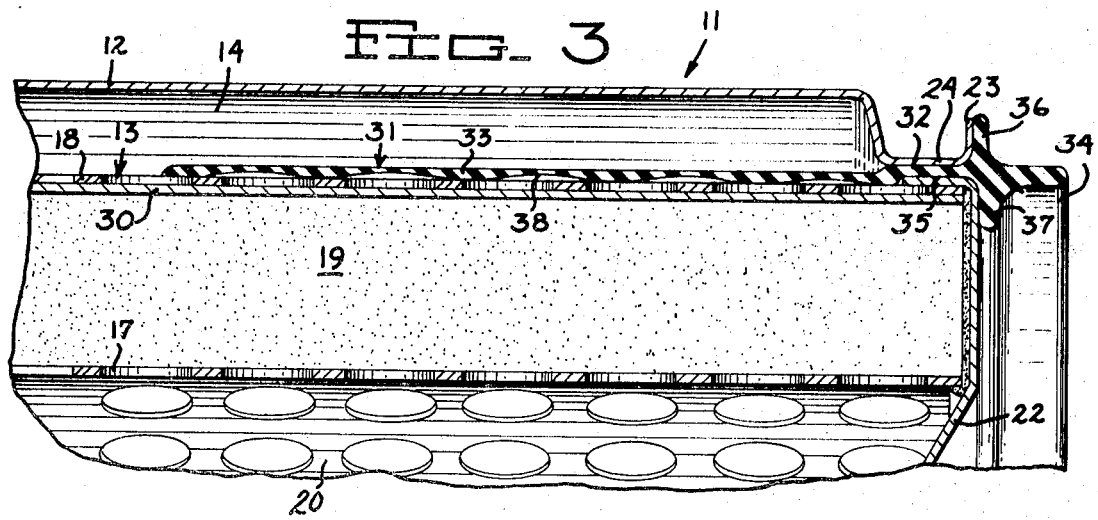
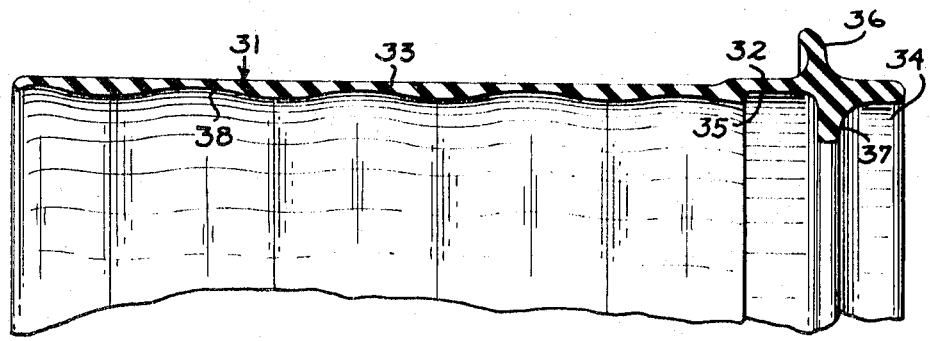
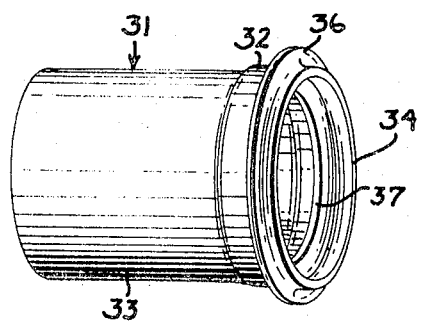
INVENTOR.
DONALD D. GRONHOLZ
DELMER L. RADEZTSKY
BY
*Merchant & Gould*
ATTORNEYS United States Patent Office 3,616,618
Patented Nov. 2, 1971

3,616,618
AIR FILTER GASKET ELEMENT
Donald D. Gronholz and Delmer L. Radeztsky, Minneapolis, Minn., assignors to Donaldson Company, Inc., Minneapolis, Minn.
Filed Aug. 13, 1969, Ser. No. 849,727
Int. Cl. B01d 50/00
U.S. Cl. 55—337          14 Claims

ABSTRACT OF THE DISCLOSURE

The disclosure is directed to a centrifugal air cleaner having a removable filter assembly that fits within an outer container of the air cleaner and forms air passages therewith. Forming part of the air filter assembly is a resilient gasket casing which encircles a part of the assembly to provide (a) air sealing function between the assembly and the outer container; (b) an inwardly extending baffle to prevent centrifugally collected dust from entering the air filter; and (c) a handle extending outwardly from the air cleaner to facilitate removal of the air filter assembly for inspection and cleaning.

---

The invention is directed generally to the field of air cleaners used with internal combustion engines, and specifically to centrifugal air cleaners that are particularly efficient in removing dust and dirt.

Under conditions where dust and dirt prevail in surrounding air, it is extremely important that air cleaners having adequate dust removal capabilities be used to enable continuous satisfactory performance of internal combustion engines. The centrifugal air cleaner has been found to perform this function very efficiently, although systematic inspection and maintenance of the air filter assembly are a necessity.

Patent No. 3,078,650, issued to Dale K. Anderson and William R. Wolff on Feb. 26, 1963, discloses and claims such a centrifugal air cleaner. In this type of device, an annular air filter assembly is inserted into a cylindrical outer container and forms an annular air passage therewith. Unfiltered air is taken in through an inlet at one end of the annular passage, and is caused to swirl or flow spirally to the opposite end of the passage. The swirling air flow causes dust and dirt particles brought in with the unfiltered air to be centrifugally forced against the outer container, and they are collected and removed through a dust outlet disposed at the opposite end of the passage. An air impervious baffle encircles a portion of the air filter assembly at the opposite end of the annular passage to prevent the collected dust and dirt particles from passing into the adjacent air filtering material.

Air in the annular passage is drawn radially inwardly by the pressure differential created by the internal combustion engine, and flows through a passage formed in the center of the air filter assembly to the carburetion system.

As mentioned above, dusty environments require systematic inspection and maintenance of the air filter assembly to insure proper engine performance. Our invention is an improvement on the aforementioned patent, and consists of a resilient gasket casing that fits over and encircles part of the air filter assembly. It not only facilitates simple removal of the air filter assembly from the outer container, but its construction also provides a plurality of other functions. For instance, part of the resilient gasket casing forms a seal which prevents air from entering the air cleaner between the outer container and the air filter assembly. Another portion of the gasket casing forms a cushion to dampen vibration between the air filter assembly and the outer container. A radially disposed bead or flange portion provides a stop which indicates when the gasket casing is in proper position on the air filter assembly. A portion of the gasket casing extending inwardly from the seal creates an air-impervious baffle that prevents collected dust and other impure particles from entering the air filter, as mentioned above. An outwardly extending portion of the casing forms a pull-tab or handle which is grasped for removal of the air filter assembly from the outer container. Lastly, the baffle portion mentioned above is constructed with corrugations that facilitate rolling of the baffle for removal from the air filter assembly to enhance cleaning and inspection of the air filter assembly. The corrugations also improve frictional engagement of the casing with the assembly.

BRIEF DESCRIPTION OF THE DRAWINGS

FIG. 3 is an enlarged fragmentary view of FIG. 1, specifically disclosing the construction and use of a resilient gasket casing;

FIG. 4 is a fragmentary section of the resilient gasket casing; and

FIG. 5 is a perspective view of the resilient gasket casing.

DESCRIPTION OF THE PREFERRED EMBODIMENT

Figure 1:
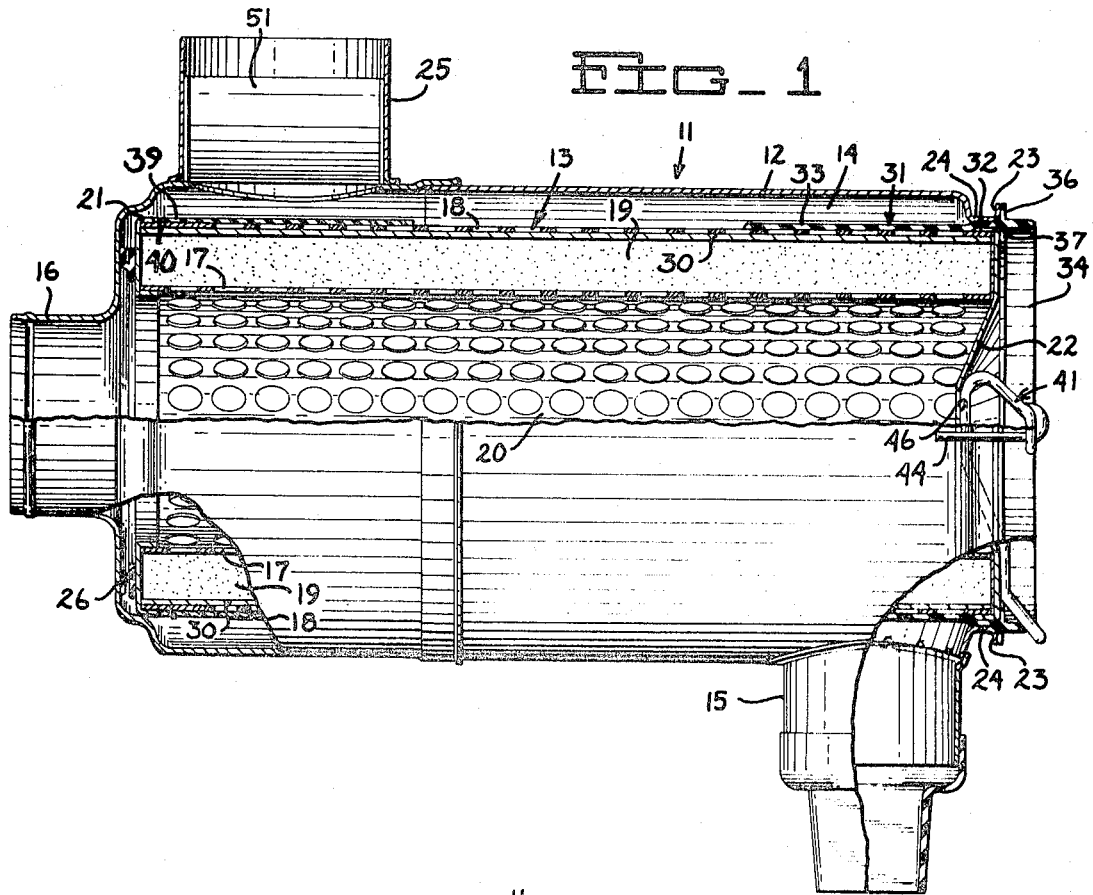
FIG. 1 is a side view of a centrifugal air cleaner embodying the inventive principle, parts thereof broken away.

FIG. 1 discloses a centrifugal air cleaner represented generally by the numeral 11. Air cleaner 11 includes an outer cylindrical container 12 which houses an air filter assembly shown generally at 13.

Outer container 12 has a neck region 24 terminating in an outwardly bent end 23. Assembly 13 is smaller in diameter than container 12, thus defining an annular air passage 14. Communicating with one end of passage 14 is an air inlet 25 which receives the air to be filtered. At the opposite end of passage 14 is an outlet 15 which receives and exhausts dust and dirt particles, as will be described below. An air outlet 16 receives a supply of filtered air and is adapted for connection with the air intake of a carburetion system for an internal combustion engine.

Air filter assembly 13 includes inner and outer perforated cylindrical shells 17 and 18, respectively, which together form an annular passage 19 into which an annular air filter 30 is inserted. The inner surface of perforated shell 17 forms a circular air passage 20 which communicates with clean air outlet 16.

The left end of annular passage 19 is closed by means of an annular cap 21, while the entire right end of air filter assembly 13, including both annular passage 19 and circular passage 20, is closed by an end cap 22. Outer and inner shells 17 and 18, and caps 21 and 22 and air filter 30 together form a replaceable filter cartridge.

Referring additionally to FIGS. 3–5, the resilient gasket casing is represented generally by the numeral 31. As shown best in FIG. 4, gasket casing 31 consists of an air seal portion 32, an air-impervious baffle portion 33 and an annular handle portion 34.

A recess 35 is formed in air seal portion 32 to receive the edge of end cap 22, as best seen in FIG. 3. Also forming part of air seal portion 32 is a flange or bead 36 which extends radially outward, and is adapted to abut the end 23 of cylindrical container 12. As FIGS. 3 and 4 disclose, flange 36 is formed in a forward position, and upon engagement with the end of container 12 is stressed rearwardly to insure a proper air seal.

Disposed on the inner surface of gasket casing 31 and extending radially inward therefrom is a flange 37 which abuts the outer front edge of end cap 22, and thus indicates when the gasket casing 31 is in proper position on the air filter assembly 13. Formed on the inner surface of the air-impervious baffle 33 are corrugations 38 which cause frictional engagement of gasket casing 31 with the outer perforated shell 18, and which also facilitate the rolling of baffle portion 33 for removal from air filter assembly 13.

Pull-tab or handle 34 is an outwardly extending portion of gasket casing 31 that is disposed outside container 12 when the assembly 13 is in place, and permits easy grasping when disassembly of the air cleaner 11 is necessary. Prior to insertion of air filter assembly 13 into outer container 12, the gasket casing 31 is rolled or otherwise placed over the right end of air filter assembly 13 until flange 37 abuts end cap 22. Air filter assembly 13 is then inserted into outer container 12 so that gasket 26 sealably engages the left end of container 12, and flange 36 abuts end 23. Air seal portion 32 is thus disposed between the necked region 24 of outer container 12 and end cap 22 to form an air seal therebetween. The position of seal portion 32 between assembly 13 and container 12 also enables it to absorb vibration that may occur therebetween.

Air filter assembly 13 also includes a resilient sleeve 39 which encircles the left end of outer perforated cylindrical shell 18 and abuts end cap 21. The extreme left end of shell 18 includes an unperforated section 40, which lies directly under sleeve 39. Thus, the abutment of sleeve 39 with end cap 21 over unperforated section 40 creates a seal to prevent the entry of air at that point. Sleeve 39 extends linearly inward along shell 18 a predetermined distance to prevent unfiltered air entering through inlet 25 from immediately passing through air filter 30.

Figure 2:
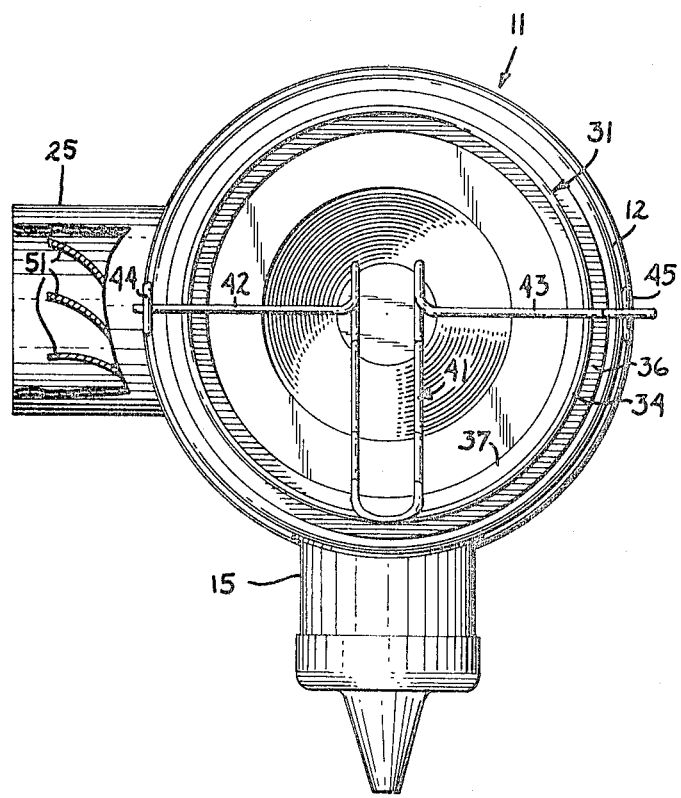
FIG. 2 is an end view of the centrifugal air cleaner, parts thereof broken away.

To hold air filter assembly 13 in its proper place in outer container 12, a latching member 41 is provided (FIGS. 1 and 2). Latching member 41 has a pair of extended biasing arms 42, 43, which receive support from a pair of ears 44, 45 mounted on outer container 12, and a camming surface 46 between arms 42, 43 which can be rotated into a spring-biased engagement with end cap 22. The arm 43 of latching member 41 is looped around its associated support ear 45 so that in the disengaged position, latching member 41 can be swung out and away from the end of air filter assembly 13 to enable removal of the assembly from outer container 12.

A gasket 26 is disposed between end cap 21 and the left end of outer container 12, to prevent the leakage of air from annular passage 14 when air filter assembly 13 is properly positioned within outer container 12.

A plurality of vanes 51 are disposed in air inlet 25 to cause unfiltered inlet air to swirl or spirally flow through annular passage 14 toward outlet 15. Sleeve 39 assists in the generation of a swirling flow by preventing radially inward filtration of air at the left end of assembly 13, as mentioned above. This spiral air flow imparts centrifugal force to any dust, dirt or other impure particles brought in through inlet 25, driving them radially outward along annular passage 14 until they are collected in and exhausted by a dust cup 27 connected to outlet 15. Baffle portion 33 of gasket casing 31 prevents the dust and dirt particles from entering air filter 30 at the extreme right end of assembly 13, where they collect prior to being exhausted.

While the dust and dirt particles are driven outward by centrifugal force, the air flowing spirally in passage 14 is drawn inwardly through the air filter assembly 13 by a pulsating pressure differential created by operation of the internal combustion engine. The air is filtered as it passes through air filter 30, and it continues in its clean state through passage 20, outlet 16 and on to the carburetion system intake.

To remove air filter assembly 13 for routine inspection, maintenance or replacement, the latching member 41 is merely rotated to its releasing position and swung outwardly, thus enabling removal of the air filter assembly 13 from outer container 12 by grasping handle portion 34. The entire air filter is easily inspected and cleaned by rolling or otherwise removing baffle portion 33 from outer perforated shell 18. Sleeve 39 can be rolled back similarly. If replacement of the assembly 13 is necessary, gasket casing 31 and sleeve 39 can be easily removed from the old cartridge and fited over the new one prior to reinsertion into outer container 12. With latching member 31 rotated to its holding position, the air cleaner 11 is ready for further use.

What is claimed is:
1. In a centrifugal fluid cleaner comprising:
    (a) an outer container of predetermined cross section and having first and second ends;
    (b) a fluid filter assembly having first and second ends with a first fluid passage formed therethrough, and including means for closing the second end;
    (c) the fluid filter assembly having a smaller cross section than said outer container and being removably disposed therein to form a second fluid passage therewith;
    (d) fluid inlet means communicating with the first end of the second passage for receiving unfiltered fluid;
    (e) first outlet means communicating with the second end of the second passage for receiving and exhausting impure particles;
    (f) second outlet means communicating with the first passage for receiving and conducting filtered fluid;
    (g) fluid control means for effecting a spiral fluid flow in the second passage between the inlet means and the first outlet means, thereby imparting centrifugal force to impure particles in the second fluid passage;
    (h) the improvement which comprises:
        (1) a removable gasket casing comprising first and second portions constructed to encircle part of the fluid filter assembly in frictional engagement;
        (2) the first portion encircling a region on the assembly proximate the second end thereof and constructed to engage the second end of the outer container in fluid-sealing relation;
        (3) the second portion being impervious to flow of fluid and extending linearly inwardly from the first portion a predetermined distance, thereby preventing the passage of impure particles into the fluid filter assembly.

2. The apparatus as defined by claim 1, wherein the removable gasket casing further comprises a third portion forming a handle to facilitate removal of the assembly from the outer container, the third portion extending away from the second end of the assembly.

3. The apparatus as defined by claim 1, wherein the fluid cleaner is an air cleaner.

4. The apparatus as defined by claim 1, wherein the gasket casing is generally cylindrical.

5. The apparatus as defined by claim 1, and further comprising a flange disposed between the first and third portions and extending radially inward therefrom to provide a stop indicating the proper position of the gasket casing on the fluid filter assembly.

6. The apparatus as defined by claim 1, wherein the inner surface of the second portion has corrugations formed therein.

7. The apparatus as defined by claim 1, wherein the first portion further comprises a flange extending radially outward and disposed for engagement with the second end of the outer container.

8. The apparatus as defined by claim 1, wherein the third portion extends linearly outward and is annular in shape.

9. The apparatus as defined by claim 1, and further comprising a fluid-impervious sleeve constructed to encircle a second part of the filter assembly proximate the first end thereof and in frictional engagement therewith.

10. A replaceable filter assembly for a centrifugal fluid cleaner having a fluid inlet, a first outlet for centrifuged impure particles and a second outlet for the filtered fluid, the filter assembly comprising:
- (a) an elongated filter cartridge having a first end, a second end and a longitudinal passage formed therein between the first and second ends;
- (b) the first end of the filter cartridge constructed for sealable engagement with one end of the centrifugal fluid cleaner; and
- (c) a removable gasket casing comprising first and second portions constructed to frictionally engage and encircle the second end of the filter cartridge;
    - (1) the first portion constructed for sealable engagement with the other end of the centrifugal fluid cleaner; and
    - (2) the second portion being impervious to the flow of fluid and extending linearly from the first portion a predetermined distance along the filter cartridge.

11. The apparatus as defined by claim 10, and further comprising a fluid-impervious sleeve constructed to encircle the filter cartridge proximate the first end thereof and in frictional engagement therewith.

12. The apparatus as defined by claim 10, wherein the filter cartridge comprises:
- (a) an outer perforated shell cylindrical in shape and open at both ends;
- (b) an inner perforated shell cylindrical in shape and open at both ends, the inner shell being smaller in diameter than the outer shell and disposed to define an annular fluid passage therewith;
- (c) a first end cap annular in shape and constructed to sealably cover the annular passage at the first end of the filter cartridge;
- (d) a second end cap circular in shape and constructed to sealably cover the second end of the filter cartridge; and
- (e) air filter material disposed in the annular passage.

13. The apparatus as defined by claim 10, wherein the removable gasket casing further comprises a third portion forming a handle to facilitate removal of the filter assembly from the centrifugal fluid cleaner, the third portion extending away from the second end of the assembly.

14. The apparatus as defined by claim 13, wherein the third portion extends linearly outward from the second end of the assembly and is annular in shape.

References Cited

UNITED STATES PATENTS

| | | | |
|---|---|---|---|
| 3,048,959 | 8/1962 | Lowther | 55—459 X |
| 3,078,650 | 2/1963 | Anderson et al. | 55—510 X |
| 3,169,844 | 2/1965 | Young | 55—510 X |
| 3,319,404 | 5/1967 | Lowther | 55—481 X |
| 3,377,783 | 4/1968 | Young | 55—481 X |
| 3,423,909 | 1/1969 | Bennett et al. | 55—502 X |
| 3,429,108 | 2/1969 | Larson | 55—337 X |

FOREIGN PATENTS

| | | | |
|---|---|---|---|
| 1,278,115 | 10/1961 | France | 55—337 |
| 1,343,346 | 10/1963 | France | 55—510 |

DENNIS E. TALBERT, JR., Primary Examiner

U.S. Cl. X.R.

55—426, 432, 435, 436, 456, 481, 498, 502, 509, 510